United States Patent
Habara et al.

(10) Patent No.: US 12,081,455 B2
(45) Date of Patent: Sep. 3, 2024

(54) COMPUTER SYSTEM AND RESOURCE ALLOCATION CONTROL METHOD

(71) Applicant: Hitachi, Ltd., Tokyo (JP)

(72) Inventors: Takuya Habara, Tokyo (JP); Shinichiro Saito, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 18/237,507

(22) Filed: Aug. 24, 2023

(65) Prior Publication Data
US 2024/0163224 A1    May 16, 2024

(30) Foreign Application Priority Data
Nov. 14, 2022 (JP) .................... 2022-182107

(51) Int. Cl.
*H04L 47/78* (2022.01)
*G06F 9/50* (2006.01)

(52) U.S. Cl.
CPC .......... *H04L 47/781* (2013.01); *G06F 9/5038* (2013.01)

(58) Field of Classification Search
CPC ............................ H04L 47/781; G06F 9/5038
See application file for complete search history.

(56) References Cited

U.S. PATENT DOCUMENTS

| 11,609,796 B2 * | 3/2023 | Casillas | G06F 9/5072 |
| 11,811,676 B2 * | 11/2023 | Wang | H04L 47/801 |
| 2017/0359271 A1 * | 12/2017 | Koh | H04L 47/70 |
| 2022/0222101 A1 | 7/2022 | Shiraki | |

FOREIGN PATENT DOCUMENTS

JP    2022-107451 A    7/2022

* cited by examiner

*Primary Examiner* — Nazia Naoreen
(74) *Attorney, Agent, or Firm* — MATTINGLY & MALUR, PC

(57) ABSTRACT

Allocation of resources is performed in which the performance of the services of each tenant can be maximized in a multi-tenant environment in which a plurality of tenants exist in which a plurality of data processing functions operate. The computer system calculates a first allocated resource amount to be allocated to each tenant based on the requested resource amount requested by each data processing function of each tenant, and calculates the second allocated resource amount to be allocated to each data processing function of each tenant based on the requested resource amount that each data processing function of each tenant requests and the first allocated resource amount of each tenant, and allocates resources to each data processing function of each tenant based on the second allocated resource amount.

8 Claims, 15 Drawing Sheets

[FIG. 1]
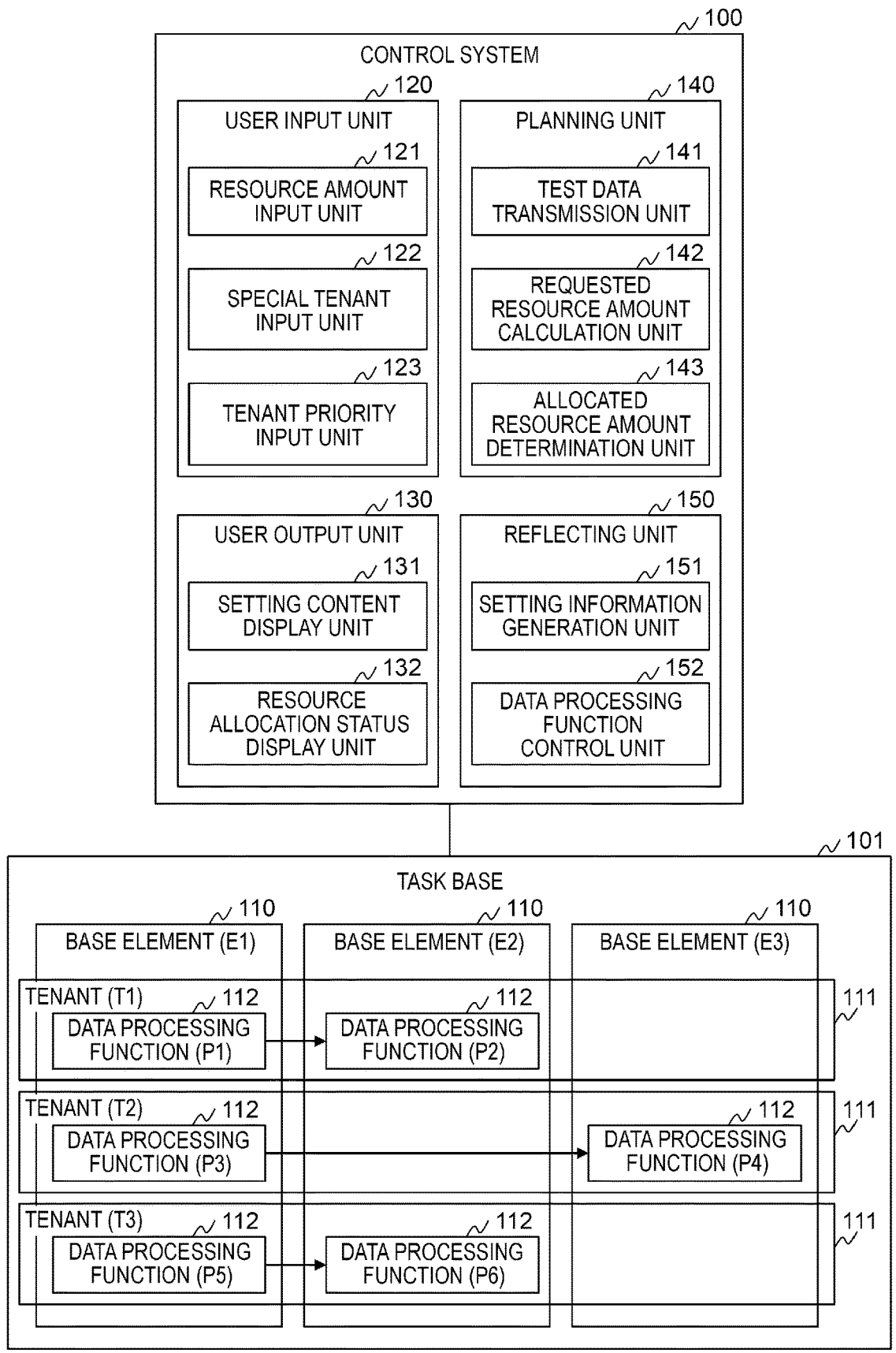

[FIG. 2]
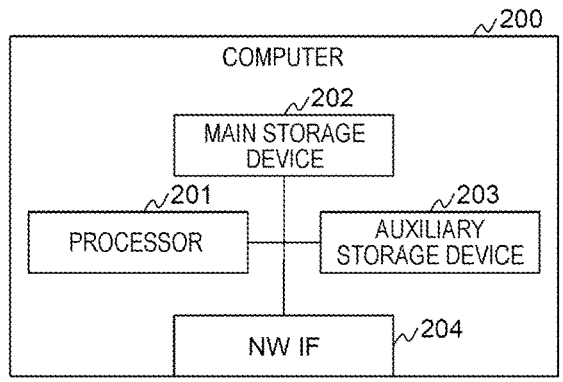
[FIG. 3]
| BASE ELEMENT ID | RESOURCE AMOUNT |
|---|---|
| E1 | 2 |
| E2 | 2 |
| E3 | 3 |
RESOURCE AMOUNT
Apply
ALLOCATION SETTING
| TENANT ID | SPECIAL FLAG | PRIORITY |
|---|---|---|
| T1 | ◯ ON  ● OFF | 3 |
| T2 | ● ON  ◯ OFF | - |
| T3 | ◯ ON  ● OFF | 2 |
Apply
Exit

[FIG. 4]

ALLOCATION SETTING 401

| TENANT ID (411) | SPECIAL FLAG (412) | PRIORITY (413) |
|---|---|---|
| T1 | OFF | 3 |
| T2 | ON | - |
| T3 | OFF | 2 |

REQUESTED RESOURCE AMOUNT 402

| TENANT ID (421) | DATA PROCESSING FUNCTION ID (422) | REQUESTED RESOURCE AMOUNT (423) |
|---|---|---|
| T1 | P1 | 1 |
| T1 | P2 | 2 |
| T2 | P3 | 1 |
| T2 | P4 | 2.5 |
| T3 | P5 | 1 |
| T3 | P6 | 1.5 |

[FIG. 5]
| TENANT ID | DATA PROCESSING FUNCTION ID | REQUESTED RESOURCE AMOUNT | ALLOCATED RESOURCE AMOUNT | BASE ELEMENT ID |
|---|---|---|---|---|
| T1 | P1 | 1 | 0.875 | E1 |
| T1 | P3 | 2 | 1.794 | E2 |
| T2 | P3 | 1 | 0.938 | E3 |
| T2 | P4 | 2.5 | 2.313 | E1 |
| T3 | P5 | 1 | 0.813 | E1 |
| T3 | P6 | 1.5 | 1.268 | E2 |

[FIG. 6]
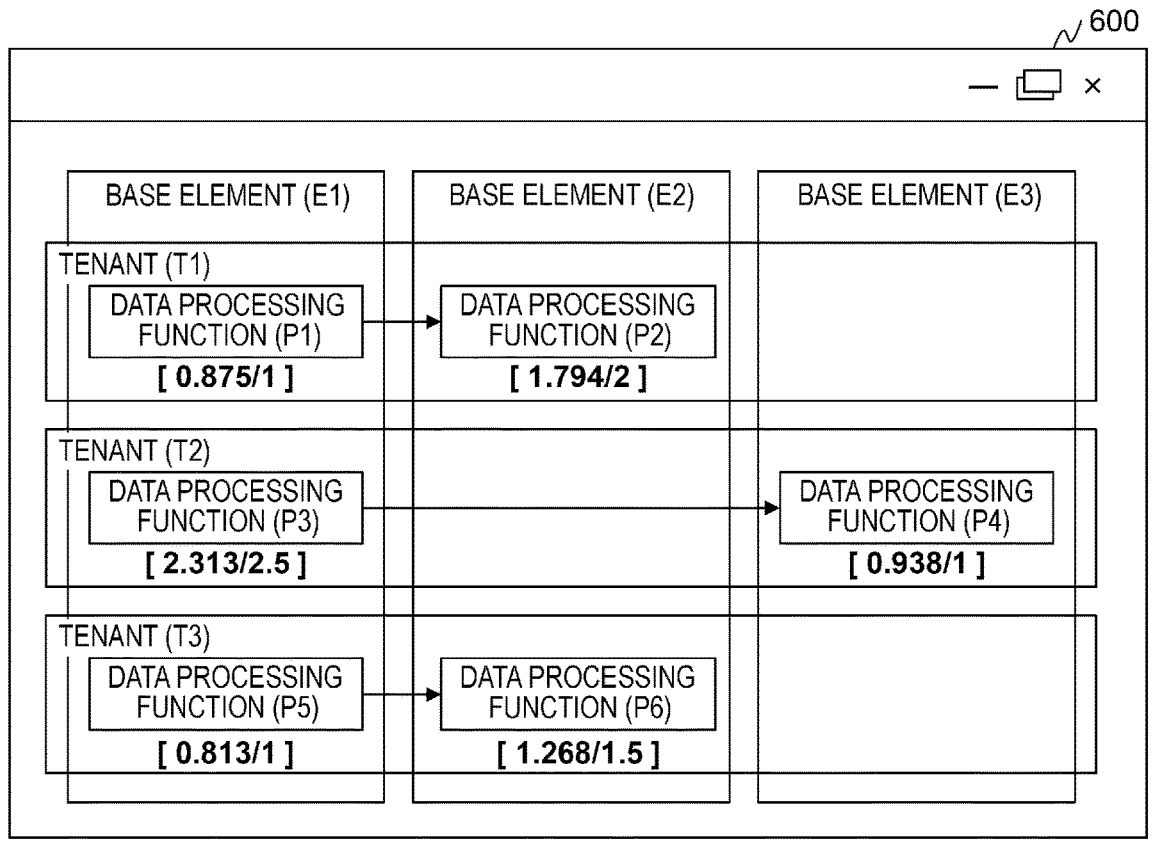
[FIG. 7]
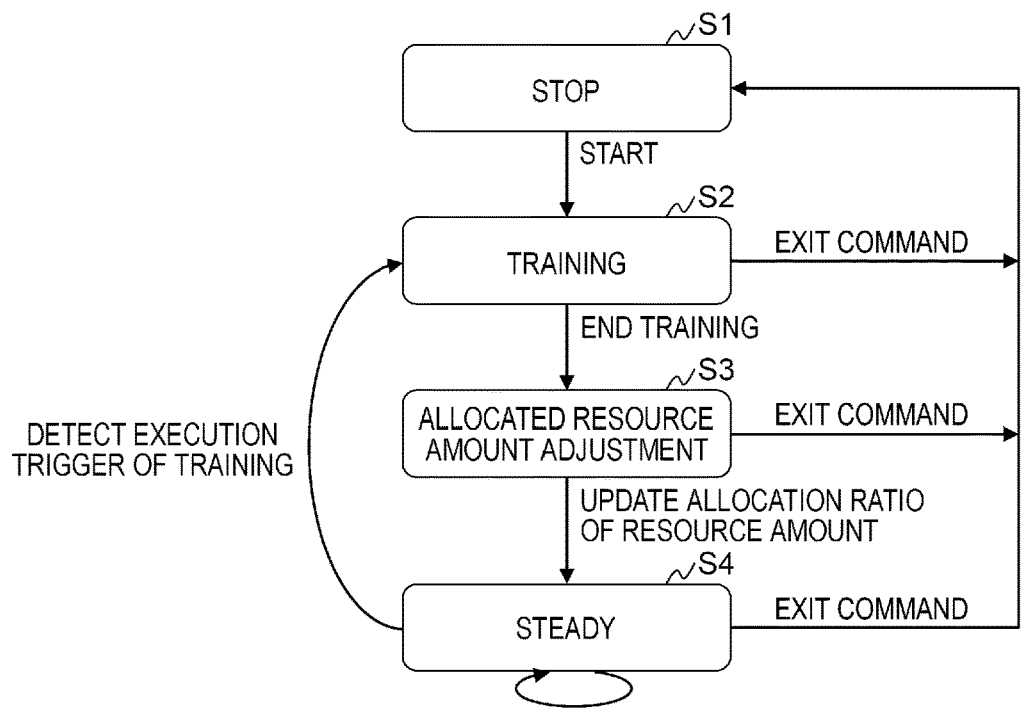

[FIG. 8]
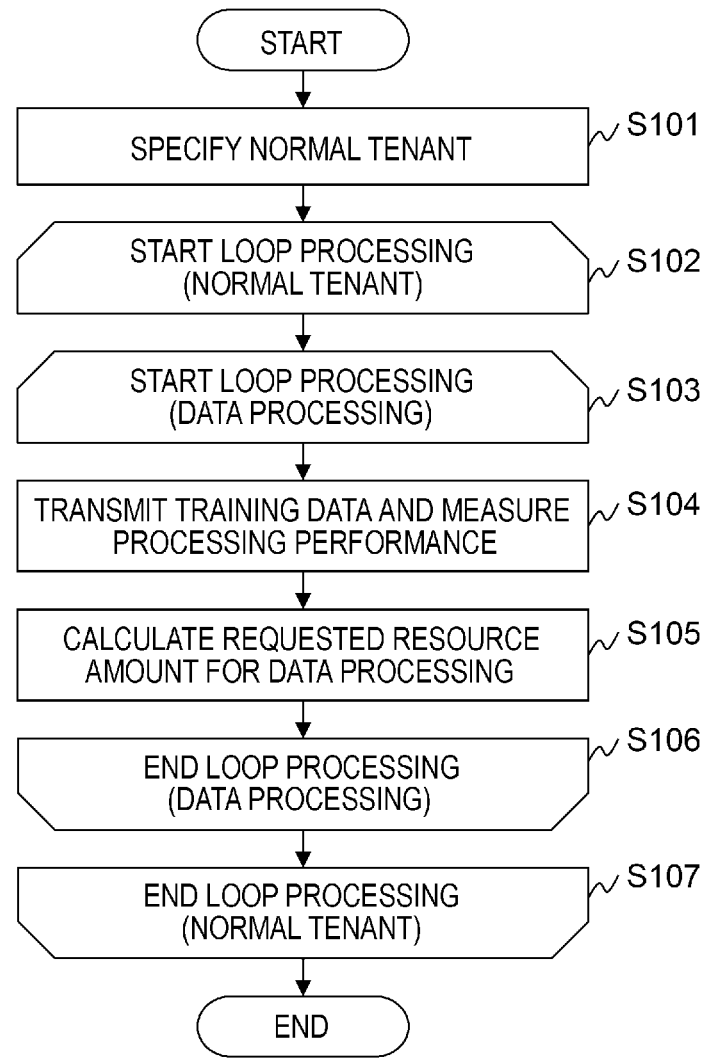

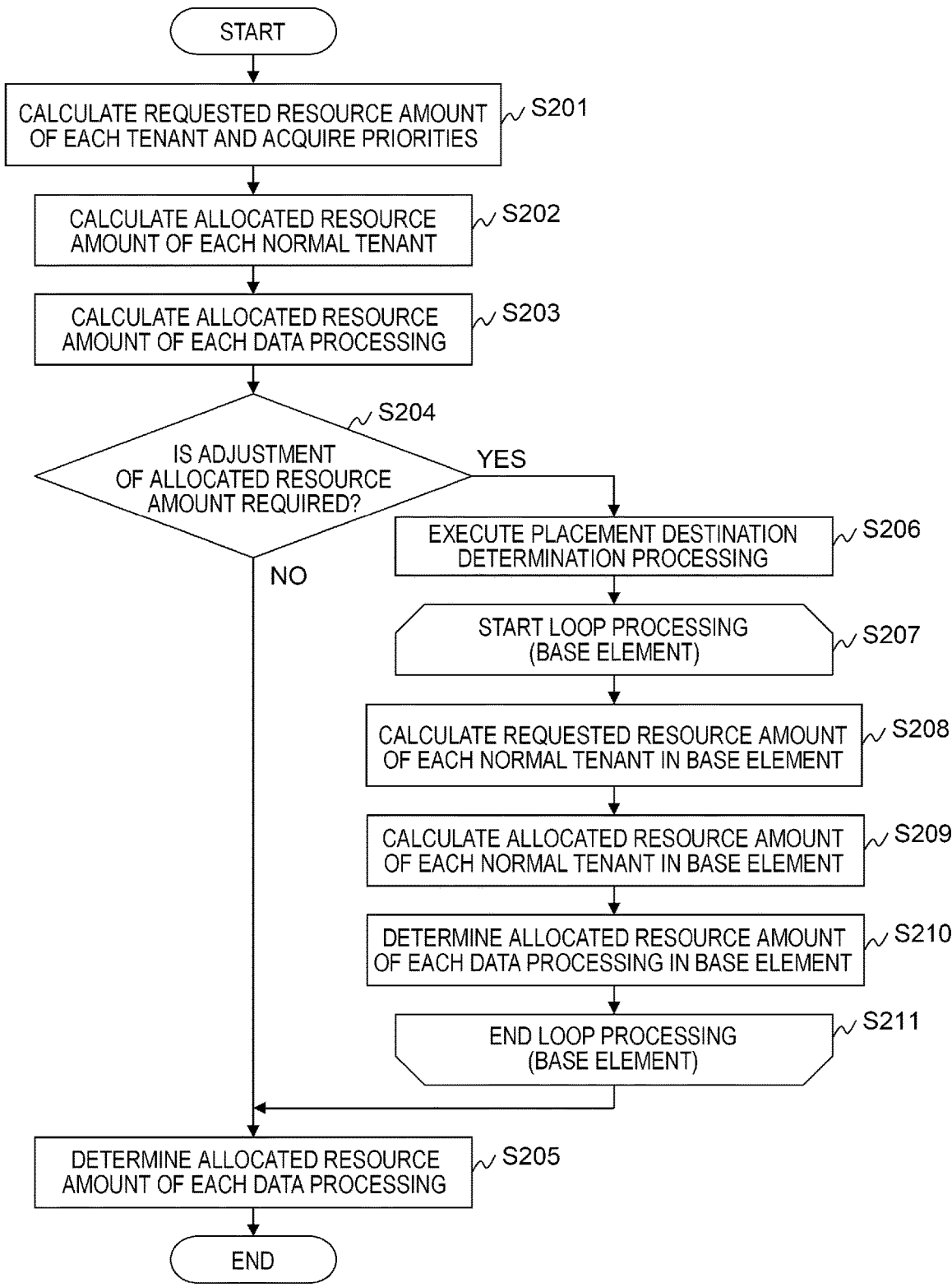
[FIG. 9]

[FIG. 10]
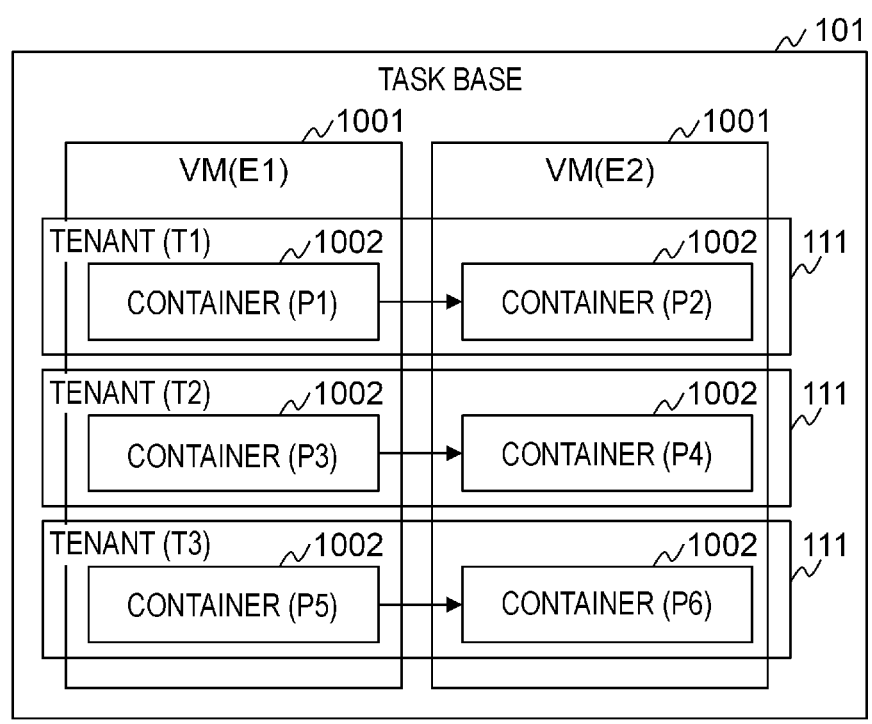

[FIG. 11]
RESOURCE AMOUNT
| BASE ELEMENT ID | RESOURCE AMOUNT |
|---|---|
| E1 | 4 core |
| E2 | 4 core |
Apply
ALLOCATION SETTING
| TENANT ID | SPECIAL FLAG | PRIORITY |
|---|---|---|
| T1 | ○ ON  ● OFF | 3 |
| T2 | ○ ON  ● OFF | 5 |
| T3 | ○ ON  ● OFF | 2 |
Apply
Exit
[FIG. 12A]
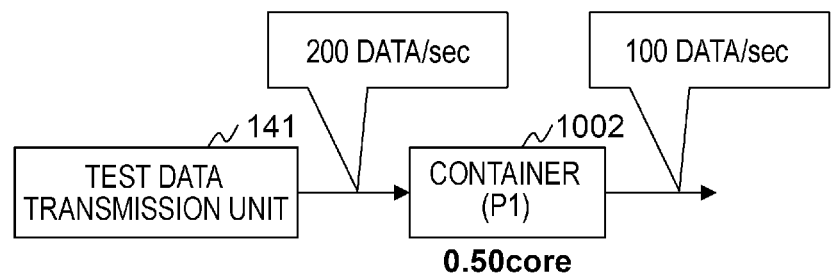

[FIG. 12B]
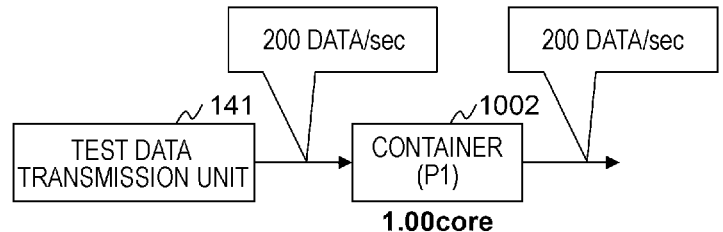
[FIG. 12C]
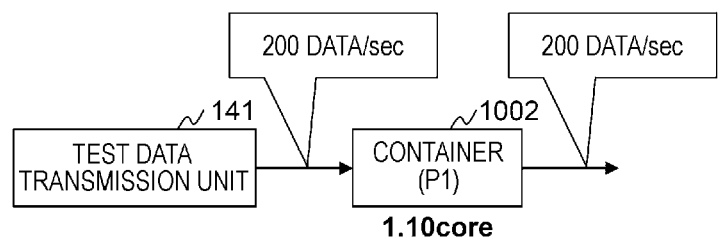
[FIG. 13A]
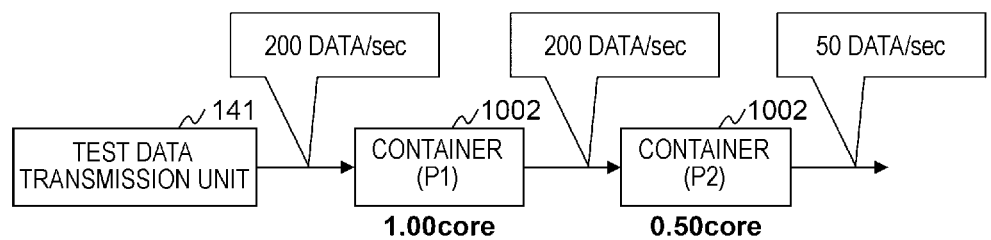
[FIG. 13B]
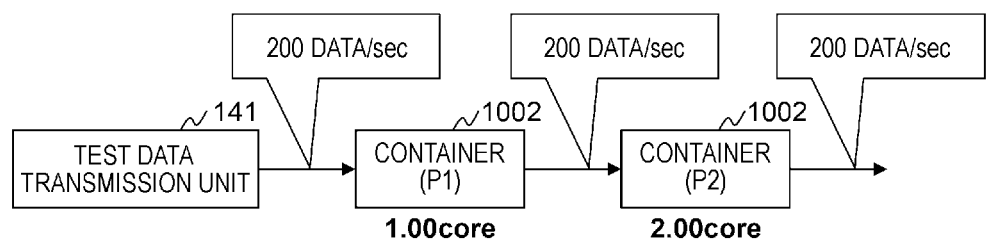
[FIG. 13C]
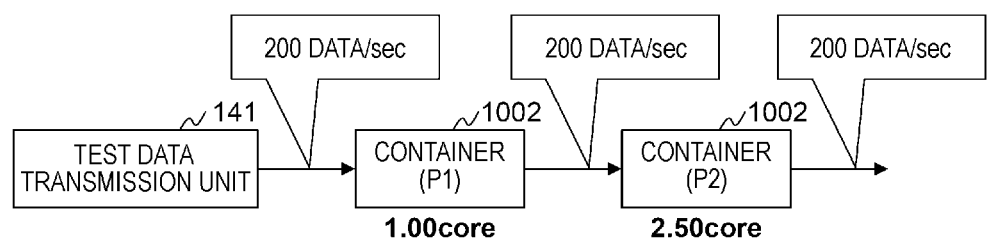

[FIG. 14]

ALLOCATION SETTING 401

| TENANT ID | SPECIAL FLAG | PRIORITY |
|---|---|---|
| T1 | OFF | 3 |
| T2 | OFF | 5 |
| T3 | OFF | 2 |

REQUESTED RESOURCE AMOUNT 402

| TENANT ID | DATA PROCESSING FUNCTION ID | REQUESTED RESOURCE AMOUNT |
|---|---|---|
| T1 | P1 | 1.00core |
| T1 | P2 | 2.00core |
| T2 | P3 | 1.00core |
| T2 | P4 | 2.50core |
| T3 | P5 | 1.00core |
| T3 | P6 | 1.50core |

[FIG. 15]

| TENANT ID 511 | DATA PROCESSING FUNCTION ID 512 | REQUESTED RESOURCE AMOUNT 513 | ALLOCATED RESOURCE AMOUNT 514 | BASE ELEMENT ID 515 |
|---|---|---|---|---|
| T1 | P1 | 1.00 CORE | 0.88 CORE | E1 |
| T1 | P2 | 2.00 CORE | 1.79 CORE | E2 |
| T2 | P3 | 1.00 CORE | 0.94 CORE | E2 |
| T2 | P4 | 2.50 CORE | 2.31 CORE | E1 |
| T3 | P5 | 1.00 CORE | 0.81 CORE | E1 |
| T3 | P6 | 1.50 CORE | 1.27 CORE | E2 |

[FIG. 16]

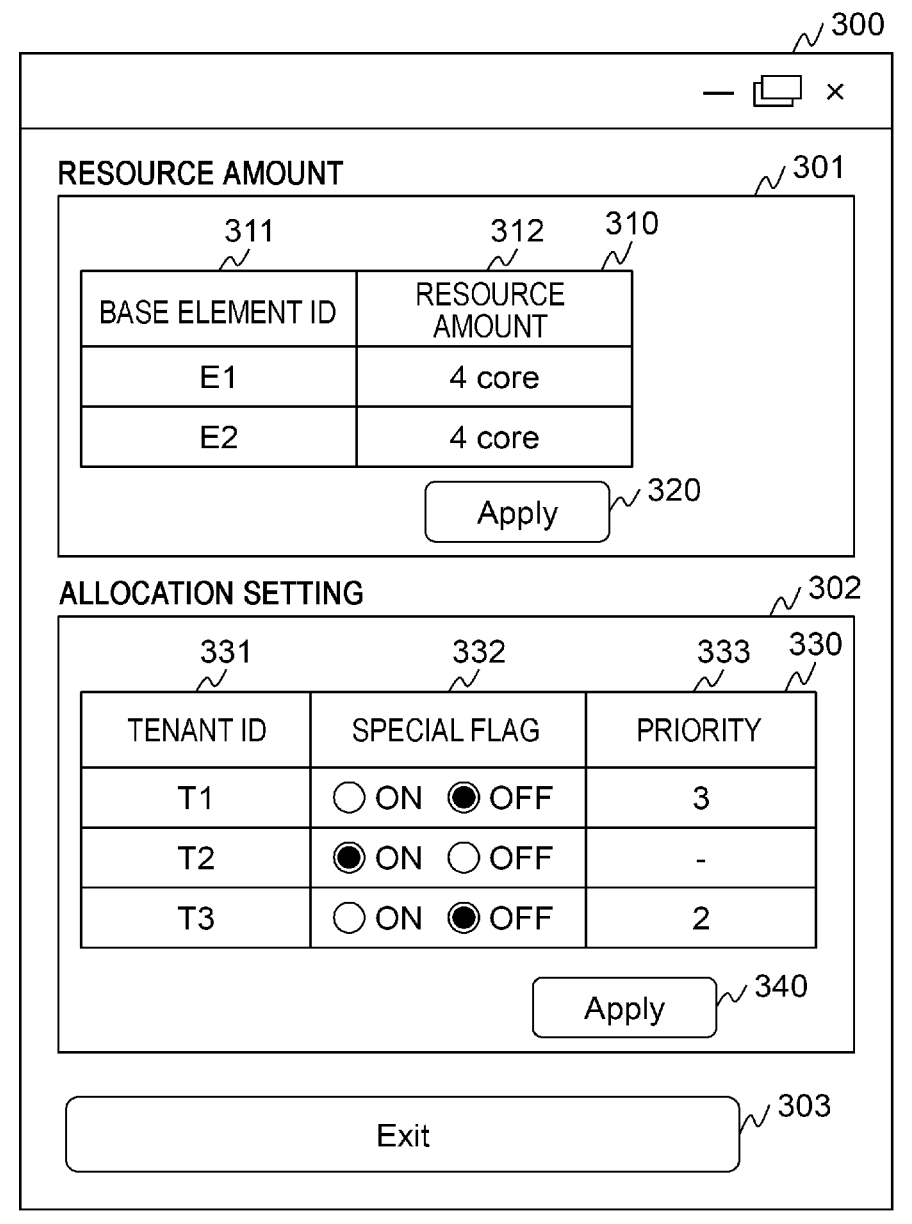

RESOURCE AMOUNT

| BASE ELEMENT ID | RESOURCE AMOUNT |
|---|---|
| E1 | 4 core |
| E2 | 4 core |

[Apply]

ALLOCATION SETTING

| TENANT ID | SPECIAL FLAG | PRIORITY |
|---|---|---|
| T1 | ○ ON  ● OFF | 3 |
| T2 | ● ON  ○ OFF | - |
| T3 | ○ ON  ● OFF | 2 |

[Apply]

[Exit]

[FIG. 17]
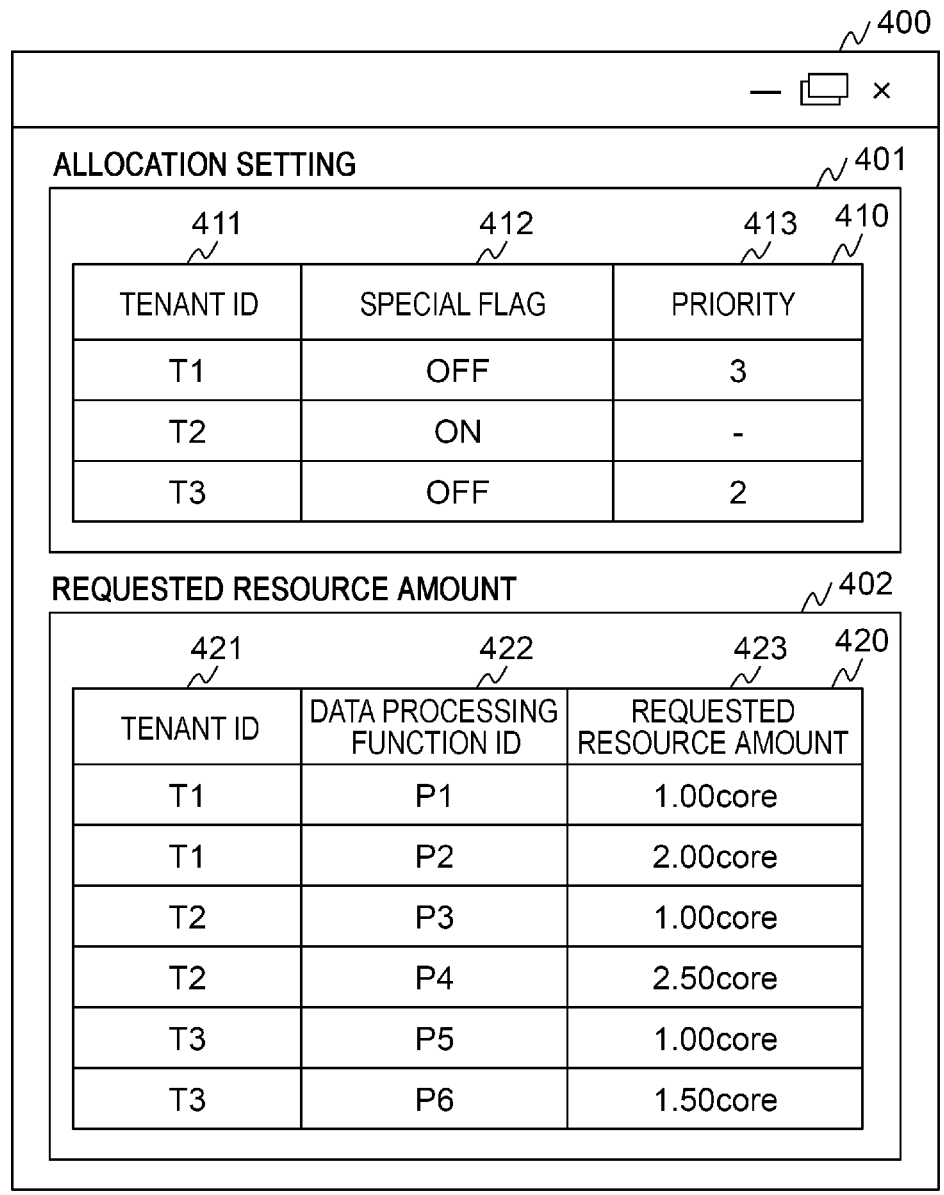

[FIG. 18]

COMPUTER SYSTEM AND RESOURCE ALLOCATION CONTROL METHOD

CLAIM OF PRIORITY

The present application claims priority from Japanese patent application JP 2022-182107 filed on Nov. 14, 2022, the content of which is hereby incorporated by reference into this application.

TECHNICAL FIELD

The present invention relates to a technology of allocating resources to a plurality of tenants that are present on a single base.

BACKGROUND ART

An Internet of Things (IoT) embodiment may perform data-processing at various locations, ranging from cloud services to equipment located at the edges of the plant site, or the like. Recently, the trend toward microservices, in which applications are subdivided and packaged by data processing function, is accelerating. Packaging eliminates hardware and operating system (OS) limitations, allowing subdivided applications to operate in a variety of environments. In the following description, the application that is subdivided and packaged is simply described as a data processing function.

In order to effectively utilize computational resources such as processors, memories, and the like, and communication resources such as network bandwidth, a multi-tenant system that operates a plurality of tenant applications may be adopted as a single base. In the following, computational resources and communication resources are simply described as resources.

In multi-tenant environments, resource allocation management is important in order to effectively utilize the finite resources of the base.

Techniques described in PTL 1 are known as a technique for distributing resources among a plurality of tenants.

PTL 1 describes "the information processing apparatus is an information processing apparatus including a plurality of workloads for each of a plurality of tenants, and includes an acquisition unit for acquiring the bandwidth information used by each tenant in another information processing apparatus, a calculation unit for calculating the bandwidth distributed to the workload processed by the own apparatus based on the bandwidth usage information acquired by the acquisition unit, and a setting unit for setting the bandwidth calculated by the calculation unit".

CITATION LIST

Patent Literature

PTL 1: JP2022-107451A

SUMMARY OF INVENTION

Technical Problem

The technique described in PTL 1 is a technique for obtaining the usage bandwidth for each tenant and controlling bandwidth so that bandwidth can be used fairly among tenants when a plurality of workloads is run by a plurality of tenants, and it is also possible to adjust the ratio of bandwidth allocated to each tenant. However, it focuses on the total amount of resources allocated to each tenant, and does not focus on the amount of resources that should be allocated to data processing functions running on the tenants. In a tenant in which a plurality of data processing functions constituting one service operate, if sufficient resources are not allocated to at least one data processing function, the processing performance of that data processing function will control the quality of the entire service.

An object of the present invention is to provide a resource allocation technique that maximizes the performance of each tenant's service in a multi-tenant environment in which a plurality of tenants exist in which a plurality of data processing functions operate.

Solution to Problem

A representative example of the invention disclosed herein is as follows. That is, a computer system includes at least one computer including a processor, a storage device connected to the processor, and a network interface connected to the processor, is connected to a base having a plurality of tenants, in which the tenant operates at least one service composed of a plurality of data processing functions, the base includes a plurality of base elements for executing the data processing functions, resources of the base elements are allocated to the data processing functions, and the at least one computer calculates a first allocated resource amount to be allocated to each of the plurality of tenants based on a requested resource amount requested by the plurality of data processing functions of each of the plurality of tenants and a first provided resource amount that the base can provide, calculates a second allocated resource amount to be allocated to the plurality of data processing functions of each of the plurality of tenants based on the requested resource amount requested by the plurality of data processing functions of each of the plurality of tenants and the first allocated resource amount of each of the plurality of tenants, and allocates resources to the plurality of data processing functions of each of the plurality of tenants based on the second allocated resource amount.

Advantageous Effects of Invention

According to the present invention, the performance of the services of each tenant can be maximized in a multi-tenant environment in which a plurality of tenants exist in which a plurality of data processing functions operate. Problems, configurations, and effects other than those described above will be clarified by the following description of the embodiments.

BRIEF DESCRIPTION OF DRAWINGS

FIG. 1 is a diagram showing an example of a configuration of a system of a first embodiment.

FIG. 2 is a diagram showing an example of a hardware configuration of a computer constituting a control system of the first embodiment.

FIG. 3 is a diagram showing an example of a screen presented by a user input unit of the first embodiment.

FIG. 4 is a diagram showing an example of a screen presented by a user output unit of the first embodiment.

FIG. 5 is a diagram showing an example of a screen presented by the user output unit of the first embodiment.

FIG. 6 is a diagram showing an example of a screen presented by the user output unit of the first embodiment.

FIG. 7 is a diagram showing an example of transition of an operating state of the control system of the first embodiment.

FIG. 8 is a flowchart showing an example of a training process executed by the control system of the first embodiment.

FIG. 9 is a flowchart showing an example of an allocated resource amount adjustment process executed by the control system of the first embodiment.

FIG. 10 is a diagram showing a specific example of a configuration of a base element and a data processing function of a work base of a second embodiment.

FIG. 11 is a diagram showing a specific example of a screen of the second embodiment.

FIG. 12A is a diagram showing a specific example of measurement of a processing performance and calculation of a requested resource amount of the second embodiment.

FIG. 12B is a diagram showing a specific example of the measurement of the processing performance and the calculation of the requested resource amount of the second embodiment.

FIG. 12C is a diagram showing a specific example of the measurement of the processing performance and the calculation of the requested resource amount of the second embodiment.

FIG. 13A is a diagram showing a specific example of the measurement of the processing performance and the calculation of the requested resource amount of the second embodiment.

FIG. 13B is a diagram showing a specific example of the measurement of the processing performance and the calculation of the requested resource amount of the second embodiment.

FIG. 13C is a diagram showing a specific example of the measurement of the processing performance and the calculation of the requested resource amount of the second embodiment.

FIG. 14 is a diagram showing a specific example of a screen of the second embodiment.

FIG. 15 is a diagram showing a specific example of the screen of the second embodiment.

FIG. 16 is a diagram showing a specific example of a screen of a third embodiment.

FIG. 17 is a diagram showing a specific example of the screen of the third embodiment.

FIG. 18 is a diagram showing a specific example of the screen of the third embodiment.

DESCRIPTION OF EMBODIMENTS

Hereinafter, embodiments of the present invention will be described with reference to the drawings. However, the present invention is not to be construed as limited to the description of the following embodiments. It will be easily understood by those skilled in the art that the specific configuration thereof may be modified without departing from the spirit or gist of the invention.

The positions, sizes, shapes, ranges, and the like of each configuration shown in the drawings, and the like may not represent actual positions, sizes, shapes, ranges, and the like in order to facilitate the understanding of the invention. Accordingly, the present invention is not limited to the positions, sizes, shapes, ranges, and the like disclosed in the drawings and the like.

First Embodiment

FIG. 1 is a diagram showing an example of a configuration of a system of a first embodiment. FIG. 2 is a diagram showing an example of a hardware configuration of a computer constituting a control system of the first embodiment.

The system is composed of a control system 100 and a work base 101. The control system 100 and the work base 101 are connected to each other via a network such as a Wide Area Network (WAN) and a Local Area Network (LAN). The control system 100 may be connected to two or more work bases 101.

The work base 101 is a base for providing resources to a work system (tenant) 111. The work base 101 can provide resources to a plurality of tenants 111. The work base 101 includes a plurality of computers including a processor, a storage device, and a network interface. Incidentally, the work base 101 may include a network switch, a storage system, or the like. The work base 101 uses virtualization techniques to divide computer resources into a plurality of base elements 110. The present invention is not limited to virtualization techniques. The base element 110 is, for example, Virtual Machine (VM).

In the tenant 111, a service composed of a plurality of data processing functions 112 is executed. A plurality of services may be executed in one tenant 111. In the present embodiment, for the sake of simplicity of description, one service is assumed to be executed in one tenant 111.

The data processing function 112 is executed using the resource of the base element 110. The data processing function 112 may be implemented, for example, as a container. Incidentally, it is not limited to the implementation of the data processing function 112, it may be a managed service provided by a cloud service provider. Arrows between the data processing functions 112 indicate the flow of data.

In FIG. 1, there are three tenants 111 in the work base 101, and a service composed of two data processing functions 112 is executed in each tenant 111.

Note that the number of tenants 111, the number of the data processing functions 112 constituting a service, the arrangement of the data processing functions 112 are examples and are not limited thereto.

The control system 100 controls the arrangement of the data processing functions 112 and the allocation of resources to the data processing functions 112. The control system 100 is configured of a computer 200 as shown in FIG. 2. The control system 100 may include a storage system and a network switch.

The computer 200 includes a processor 201, a main storage device 202, an auxiliary storage device 203, and a network interface 204. The computer 200 may include an input device and an output device.

The processor 201 executes a program stored in the main storage device 202. The processor 201 operates as a functional unit (module) that implements a specific function by executing the processing according to the program. In the following description, when the processing is mainly described by the functional unit, it indicates that the processor 201 is executing a program to implement the functional unit. The main storage device 202 is a memory or the like and stores the programs executed by the processor 201 and the data used by the programs. The auxiliary storage device 203 is a Hard Disk Drive (HDD), a Solid State Drive (SSD), and the like, and stores the data permanently. Programs and data stored in the main storage device 202 may be stored in the auxiliary storage device 203. In this case, the processor 201 reads the programs and data from the auxiliary storage device 203 and loads them into the main storage device 202. The network interface 204 communicates with other devices via a network.

The control system 100 includes a user input unit 120, a user output unit 130, a planning unit 140, and a reflecting unit 150.

The user input unit 120 is a functional unit that receives various types of user input, and includes a resource amount input unit 121, a special tenant input unit 122, and a tenant priority input unit 123.

The resource amount input unit 121 receives the input relating to the resource amount that each base element 110 can provide. The resource amount includes, for example, the number of processors, the number of cores, the memory capacity, and the communication bandwidth.

The special tenant input unit 122 receives the input relating to the tenant 111 to always allocate a resource of the specified resource amount. In the following description, the tenant 111 that always allocates the resource of the specified resource amount is described as a special tenant 111, and the other tenant 111 is described as a normal tenant 111. If the special tenant 111 and the normal tenant 111 are not distinguished, it is described as a tenant 111. The special tenant 111 is controlled to ensure that resources of the specified resource amount are always allocated.

The tenant priority input unit 123 receives input relating to the priority of allocation of resources of each normal tenant 111. Note that the priority is not set for the special tenant 111. In the present embodiment, the priority is a positive real number, the higher the value, the higher the priority. The normal tenant 111, which has a higher priority, is given priority in allocating resources.

The user output unit 130 is a functional unit for outputting various information, and includes a setting content display unit 131 and a resource allocation status display unit 132.

The setting content display unit 131 displays the user input received by the user input unit 120. The resource allocation status display unit 132 displays information on the resource amount and the like allocated to the data processing function 112.

The planning unit 140 is a functional unit that generates a plan relating to the arrangement of the data processing function 112 and the amount of resources allocated to the data processing function 112, and includes a test data transmission unit 141, a requested resource amount calculation unit 142, and an allocated resource amount determination unit 143.

The test data transmission unit 141 transmits test data for acquiring measurement values used for calculating the amount of resources required for the data processing function 112. The requested resource amount calculation unit 142 calculates the amount of resources required for the data processing function 112 based on the measurement value obtained by transmitting the test data. The allocated resource amount determination unit 143 determines the amount of resources allocated to the data processing function 112.

The reflecting unit 150 is a functional unit for reflecting the operation result of the planning unit 140 to the work base 101 and includes a setting information generation unit 151 and a data processing function control unit 152.

The setting information generation unit 151 generates setting information for allocating the resource amount determined for the data processing function 112. For example, if the base element 110 is a container, information relating to the start of the container is generated as setting information.

The data processing function control unit 152 controls the data processing function 112 based on the setting information. For example, the data processing function control unit 152 restarts the data processing function 112 for changing the amount of resources allocated based on the setting information.

FIG. 3 is a diagram showing an example of a screen presented by the user input unit 120 of the first embodiment.

The user input unit 120 presents a screen 300. The screen 300 includes an operation field 301, an operation field 302, and a stop button 303.

The operation field 301 is an operation field for setting information about the resource amount that can be provided by the base element 110, and includes a table 310 and an apply button 320.

The table 310 stores an entry that includes a base element ID 311 and a resource amount 312. One entry corresponds to one base element 110. Note that the fields included in the entry are examples and are not limited thereto. For the simplicity of description, an example focusing only on the number of processors is shown in the embodiment. Entries may include fields such as memory capacity.

The base element ID 311 is a field that stores the ID of the base element 110. A user may manually enter an ID into the base element ID 311 or the control system 100 may acquire the ID from the work base 101 and automatically enter the ID into the base element ID 311.

The resource amount 312 is a field that stores the amount of resources that can be provided by the base element 110. A user may manually enter a resource amount in the resource amount 312, a control system 100 may acquire the resource amount from the work base 101, and the resource amount may be automatically input to the resource amount 312.

The apply button 320 is an operation button for reflecting the setting contents of the table 310. When the user operates the apply button 320, setting contents of the table 310 are stored in the control system 100.

The operation field 302 is an operation field for setting information about the special tenant 111 and the priority, and includes a table 330 and an apply button 340.

The table 330 stores an entry containing a tenant ID 331, a special flag 332, and a priority 333. One entry corresponds to one tenant 111. Note that the fields included in the entry are examples and are not limited thereto.

The tenant ID 331 is a field that stores the ID of the tenant 111. A user may manually enter an ID into the base element ID 311 or the control system 100 may acquire the ID of the tenant 111 from the work base 101 and automatically enter the ID into the base element ID 311.

The special flag 332 is a field for storing a flag for specifying whether or not to set a tenant 111 as a special tenant 111. The special flag 332 displays ON and OFF as a radio button. When it is set as the special tenant 111, the radio button is operated to ON, and when it is set as the normal tenant 111, the radio button is operated to OFF. Note that the special flag 332 may be set to ON and OFF in the operation of the check box.

The priority 333 is a field that stores the priority of the normal tenant 111. Note that the priority 333 of the entry corresponding to the special tenant 111 is blank.

The apply button 340 is an operation button for reflecting the setting contents of the table 330. When the user operates the apply button 340, the setting contents of the table 330 are stored in the control system 100.

The stop button 303 is an operation button for transmitting an exit command to the control system 100.

FIG. 4 is a diagram showing an example of a screen presented by the user output unit 130 of the first embodiment.

The user output unit 130 presents a screen 400. The screen 400 includes a display field 401 and a display field 402.

The display field 401 is a field for displaying the information of the special tenant 111 and the priority set by interpreting the user input unit 120. The table 410 is displayed on the display field 401. The table 410 stores an entry containing a tenant ID 411, a special flag 412, and a priority 413. One entry corresponds to one tenant 111. Note that the fields included in the entry are examples and are not limited thereto.

The tenant ID 411 is a field that stores the ID of the tenant 111. The special flag 412 is a field that stores a flag indicating whether the tenant 111 is a special tenant 111. The priority 413 is a field that stores the priority of the normal tenant 111.

The display field 402 is a field for displaying information on the resource amount of the data processing function 112 calculated by the requested resource amount calculation unit 142. The table 420 is displayed on the display field 402. The table 420 stores an entry that includes a tenant ID 421, a data processing function ID 422, and a requested resource amount 423. There is one entry for the combination of the tenant 111 and the data processing function 112. Note that the fields included in the entry are examples and are not limited thereto.

The tenant ID 421 is a field that stores the ID of the tenant 111. The data processing function ID 422 is a field that stores the ID of the data processing function 112. The requested resource amount 423 is a field that stores the amount of resources required by the data processing function 112 executed on the tenant 111.

FIG. 5 is a diagram showing an example of a screen presented by the user output unit 130 of the first embodiment.

The user output unit 130 presents information on the resource amount of the data processing function 112 determined by the allocated resource amount determination unit 143 on the screen 500. The table 510 is displayed on the screen 500. The table 510 stores an entry that includes a tenant ID 511, a data processing function ID 512, a requested resource amount 513, an allocated resource amount 514, and a base element ID 515. There is one entry for the combination of the tenant 111 and the data processing function 112. Note that the fields included in the entry are examples and are not limited thereto.

The tenant ID 511 is a field that stores the ID of the tenant 111. The data processing function ID 512 is a field that stores the ID of the data processing function 112. The requested resource amount 513 is a field that stores the amount of resources required by the data processing function 112 executed on the tenant 111. The allocated resource amount 514 is a field that stores the resource amount determined by the allocated resource amount determination unit 143, and the base element ID 515 is a field that stores the ID of the base element 110 that provides the resource.

FIG. 6 is a diagram showing an example of a screen presented by the user output unit 130 of the first embodiment.

The user output unit 130 presents information on the arrangement of the data processing function 112 and the allocated resource amount in the work base 101 on a screen 600. The screen 600 displays an image indicating the amount of resources allocated to the base element 110, the data processing function 112 placed in the base element 110, and the data processing function.

The user output unit 130 may present only one of the screens 500 and 600, or both screens 500 and 600.

FIG. 7 is a diagram showing an example of the transition of the operating state of the control system 100 of the first embodiment.

The initial state of the control system 100 is a stop state S1. The control system 100, when started, transitions to a training state S2.

In the training state S2, the control system 100 performs a training process to calculate the amount of resources required for the data processing function 112. When the training process is completed, the control system 100 transitions to an allocated resource amount adjustment state S3.

The transition to the training state S2 is made during the time when the service of the tenant 111 is not executed.

In the allocated resource amount adjustment state S3, the control system 100 executes an allocated resource amount adjustment process for adjusting the amount of resources allocated to the data processing function 112. After the allocated resource amount adjustment process is completed, the control system 100 transitions to a steady state S4. Note that the amount of resources allocated to the data processing function 112 may not be changed in the allocated resource amount update process.

In the steady state S4, the control system 100 periodically monitors an execution trigger of the training process. For example, the control system 100 monitors whether or not the service of the tenant 111 is in a non-running time zone. If no execution trigger for the training process is detected, the control system 100 maintains the steady state S4. When an execution trigger for the training process is detected, the control system 100 transitions to the training state S2.

When the exit command is detected in the training state S2, the allocated resource amount adjustment state S3, and the steady state S4, the control system 100 transitions to the stop state S1.

FIG. 8 is a flowchart showing an example of a training process executed by the control system 100 of the first embodiment.

It is assumed that information is input through the screen 300 shown in FIG. 3 before the training process is executed.

The planning unit 140 identifies the normal tenant 111 (step S101), and starts the loop processing of the normal tenant 111 (step S102). Specifically, the planning unit 140 selects one normal tenant 111 from among the normal tenants 111. In the following, the selected normal tenant 111 is described as a target tenant 111.

Next, the planning unit 140 starts the loop processing of the data processing function 112 of the target tenant 111 (step S103). Specifically, the planning unit 140 selects one of the data processing functions 112 in the processing order. In the following, the selected data processing function 112 is described as a target data processing function 112.

The planning unit 140 transmits training data to the target data processing function 112 and measures the processing performance (Step S104). Specifically, the resource amount allocated to the target data processing function 112 by the requested resource amount calculation unit 142 is changed, and the test data transmission unit 141 transmits test data to the target data processing function 112 to measure the processing performance of the data processing function 112. The planning unit 140 repeatedly executes the above processing until the end condition is satisfied. The end condition is, for example, that the number of executions is greater than a threshold value, or the processing performance does not change even if the resource amount is increased.

The method of measuring the processing performance may include (1) a method of comparing the amount of test data transmitted per unit time with the amount of data processed by the target data processing function 112 per unit time, (2) a method of measuring the time from the transmission of the test data until the target data processing function 112 completes the processing. Note that the method of measuring the processing performance described above is an example and is not limited thereto.

If the target data processing function 112 is second or later in the processing order, the requested resource amount calculation unit 142 allocates a sufficient amount of resources to the data processing function 112 that is earlier in the processing order than the target data processing function 112. This is to avoid that the data processing function 112 before the target data processing function 112 in the processing order becomes a bottleneck and the processing performance of the target data processing function 112 cannot be accurately measured.

The planning unit 140 calculates the requested resource amount D_ij of the target data processing function 112 based on the measurement result of the processing performance (step S105). Specifically, the requested resource amount calculation unit 142 calculates the resource amount that can sufficiently ensure the processing performance as the requested resource amount based on the measurement result of the processing performance. For example, the processing performance is maximized and the minimum amount of resources is calculated as the requested resource amount.

Here, i is an index that identifies the normal tenant 111 and j is an index that identifies the data processing function 112. In the following, the normal tenant 111 whose index is i is described as a normal tenant 111(i), and the data processing function 112 whose index is j is described as a data processing function 112(j).

The planning unit 140 determines whether the processing is completed for all of the data processing functions 112 of the target tenant 111 (step S106).

If the processing has not been completed for all of the data processing functions 112 of the target tenant 111, the planning unit 140 returns to step S103 and selects a new target data processing function 112.

If the processing is completed for all of the data processing functions 112 of the target tenant 111, the planning unit 140 determines whether the processing is completed for all normal tenants 111 (step S107).

If the processing has not been completed for all normal tenants 111, the planning unit 140 returns to step S102 and selects a new target tenant 111.

When the processing is completed for all normal tenants 111, the planning unit 140 ends the training process.

FIG. 9 is a flowchart showing an example of the allocated resource amount adjustment process executed by the control system 100 of the first embodiment.

The planning unit 140 calculates the requested resource amount D_i of each tenant 111, and also acquires the priority P_i of the special flag and each normal tenant 111 (step S201). Specifically, as shown in Equation (1), the allocated resource amount determination unit 143 calculates the total requested resource amount of the data processing function 112 running on the tenant 111 as the requested resource amount of the tenant 111(i).

[Formula 1]

$$D_i = \sum_j D_{ij} \qquad (1)$$

In step S201, the requested resource amount of the data processing function 112 of the special tenant 111 is also acquired.

The planning unit 140 calculates the allocated resource amount of each normal tenant 111 (step S202). Here, an example of a method of calculating the allocated resource amount of each normal tenant 111 is described.

The allocated resource amount determination unit 143 calculates the value obtained by subtracting the requested resource amount of the special tenant 111 from the total amount of resources that each base element 110 can provide as a total resource amount S. The allocated resource amount determination unit 143 calculates the allocated resource amount ST_i of the normal tenant 111(i) using Equation (2).

[Formula 2]

$$ST_i = D_i - \frac{(D-S) \cdot D_i}{C \cdot P_i} \qquad (2)$$

Here, D is the sum of the requested resource amounts D_i of all normal tenants 111 and is given by Equation (3). Here, U represents a set of normal tenants 111. C is the coefficient used to match the total amount of allocated resources with the total amount of requested resources, and is given by Equation (4).

[Formula 3]

$$D = \sum_{i \in U} D_i \qquad (3)$$

[Formula 4]

$$C = \sum_i \frac{D_i}{P_i} \qquad (4)$$

The aforementioned method for calculating the allocated resource amount of each normal tenant 111 is an example and is not limited thereto.

Next, the planning unit 140 calculates the allocated resource amount of the data processing function 112 (step S203). For example, the allocated resource amount determination unit 143 calculates the allocated resource amount SF_ij of the data processing function 112(j) using Equation (5).

[Formula 5]

$$SF_{ij} = \frac{ST_i \cdot D_{ij}}{D_i} \qquad (5)$$

The aforementioned method for calculating the allocated resource amount of data processing function 112 is an example and is not limited thereto.

Next, the planning unit 140 determines whether or not adjustment of the allocated resource amount of the data processing function 112 is necessary (step S204). Specifically, the following processing is performed.

(S204-1) The allocated resource amount determination unit 143 selects a base element 110.

(S204-2) The allocated resource amount determination unit 143 calculates the total allocated resource amount of the data processing function 112 executed by the selected base element 110. In this case, the tenant 111 is not distinguished.

That is, the sum of the allocated resource amount of the data processing function 112 of the special tenant 111 and the allocated resource amount SF_ij of the data processing function 112(j) of the normal tenant 111(j) is calculated.

(S204-3) The allocated resource amount determination unit 143 determines whether or not the sum is equal to or less than the amount of resources that can be provided by the selected base element 110. If the sum is greater than the amount of resources that can be provided by the selected base element 110, the allocated resource amount determination unit 143 determines that adjustment of the allocated resource amount of the data processing function 112 is necessary.

(S204-4) If the sum is less than or equal to the amount of resources that can be provided by the selected base element 110, the allocated resource amount determination unit 143 determines whether or not the processing has been completed for all the base elements 110.

(S204-5) If the processing has not been completed for all the base elements 110, the allocated resource amount determination unit 143 returns to S204-1 and performs the same processing. If the processing is completed for all the base elements 110, the allocated resource amount determination unit 143 determines that adjustment of the allocated resource amount of the data processing function 112 is not necessary.

If the adjustment of the allocated resource amount of the data processing function 112 is not necessary, the planning unit 140 proceeds to step S205.

If the adjustment of the allocated resource amount of the data processing function 112 is necessary, the planning unit 140 executes the arrangement destination determination processing for optimizing the arrangement of the data processing functions 112 of all tenants 111 (step S206). For example, the allocated resource amount determination unit 143 determines the arrangement of the data processing functions 112 of each tenant 111 so that the Euclidean distance representing the difference between the total amount of requested resources of the data processing functions 112 on the base element 110 and the amount of resources that can be provided by the base element 110 is minimized.

The above arrangement method is an example and is not limited thereto. For each base element 110, it is sufficient if the requested resource amount of the data processing function 112 can be arranged so as to be less than or equal to the amount of resources that can be provided.

The planning unit 140 starts the loop processing of the base element 110 (step S207). Specifically, the allocated resource amount determination unit 143 selects one base element 110. The selected base element 110 is described below as the target base element 110.

Next, the planning unit 140 calculates the requested resource amount D_i,k of each normal tenant 111 in the target base element 110 (step S208). Specifically, the requested resource amount D_i,k of the normal tenant 111(i) is calculated using Equation (6). Here, A_k represents the set of data processing functions 112 of the normal tenant 111(i) that operates on the target base element 110(k).

[Formula 6]

$$D_{i,k} = \sum_{j \in A_k} D_{ij} \quad (6)$$

Next, the planning unit 140 calculates the allocated resource amount of each normal tenant 111 in the target base element 110 (step S209). Specifically, the allocated resource amount of the normal tenant 111(i) is calculated using Equations (7), (8), and (9).

[Formula 7]

$$ST_{i,k} = D_{i,k} - \frac{(D_k - S_k) \cdot D_{i,k}}{C_k \cdot P_i} \quad (7)$$

[Formula 8]

$$D_k = \sum_{i \in U} D_{i,k} \quad (8)$$

[Formula 9]

$$C_k = \sum_i \frac{D_{i,k}}{P_i} \quad (9)$$

Here, S_k is the value obtained by subtracting the requested resource amount of the data processing function 112 on the target base element 110 of the special tenant 111 from the total amount of resources that can be provided by the target base element 110.

Next, the planning unit 140 calculates the allocated resource amount of the data processing function 112 operating on the target base element 110 (step 210). Specifically, the allocated resource amount of the data processing function 112 operating on the target base element 110 is calculated using Equation (10).

[Formula 10]

$$SF_{ij,k} = \frac{ST_{i,k} \cdot D_{ij}}{D_{i,k}} (j \in A_k) \quad (10)$$

The planning unit 140 determines whether or not the processing has been completed for all the base elements 110 (step S211).

If processing has not been completed for all the base elements 110, the planning unit 140 returns to step S207 and selects a new target base element 110.

When the processing is completed for all the base elements 110, the planning unit 140 proceeds to step S205.

In step S205, the planning unit 140 generates the setting information by outputting the generation instruction of the setting information to the reflecting unit 150 (step S205). The instruction includes information on the allocated resource amount and arrangement of the data processing function 112.

When the base element 110 is a container, the setting information generation unit 151 generates the starting setting information of the container.

Next, the reflecting unit 150 controls the work base 101 based on the setting information (step S205), and then ends the allocated resource amount adjustment process.

The control system 100 of the present embodiment allocates resources to the data processing function 112 in consideration of the requested resource amount of each data processing function 112 of the tenant 111, thereby maximizing the performance of the services provided by the tenant 111 and effectively utilizing the finite resources of the work base 101.

Also, if the amount of allocated resources of the data processing function 112 on the base element is greater than the amount of resources that can be provided by the base element, the control system 100 determines the arrangement of the data processing functions 112 and the allocated resource amount by focusing on the amount of resources that can be provided by the base element. This enables maximization of service performance and effective use of resources within the amount of resources that can be provided by the work base 101.

Second Embodiment

In the second embodiment, a specific operation of the control system 100 will be described. In particular, the specific operation in the case of not including the special tenant 111 will be described.

FIG. 10 is a diagram showing a specific example of the configuration of the base element 110 and the data processing function 112 of a work base 101 of the second embodiment.

The base element 110 is a VM 1001. The data processing function 112 is implemented as a container 1002. The work base 101 includes a tenant 111 (T1), a tenant 111 (T2), and a tenant 111 (T3), and each tenant 111 shall execute a service composed of two containers 1002. The first container 1002 (P1), container 1002 (P3), and container 1002 (P5) of each tenant 111 are located in the VM 1001 (E2), and the second container 1002 (P2), container 1002 (P4), and container 1002 (P6) of each tenant 111 are located in VM 1001 (E2).

FIG. 11 is a diagram showing a specific example of the screen 300 of the second embodiment.

In the second embodiment, the resource allocated to the container 1002 is the core of the processor. The number of cores of the processor which the VM 1001 (E1) and the VM 1001 (E2) can provide is 4 cores. Further, each of the tenant 111 (T1), the tenant 111 (T2), and the tenant 111 (T3) is set as a normal tenant 111, and the priority thereof is "3", "5", and "2". In this case, the tenant 111 (T2) has the highest priority and the tenant 111 (T3) has the lowest priority.

FIGS. 12A, 12B, 12C, 13A, 13B, and 13C are diagrams showing specific examples of the measurement of the processing performance and the calculation of the requested resource amount of the second embodiment.

The requested resource amount calculation unit 142 changes the resource amount allocated to the target data processing function 112 and measures the amount of data to be processed per unit time. When the data amount of the test data to be transmitted per unit time transmitted by the test data transmission unit 141 is equal to the data amount to be processed per unit time, the requested resource amount calculation unit 142 determines that the processing performance can be ensured.

FIGS. 12A, 12B, and 12C show an example of the measurement of processing performance and the calculation of requested resource amount for the container 1002 (P1) of the tenant 111 (T1).

FIG. 12A shows the measurement results when 0.50 cores are allocated to the container 1002 (P1). The data amount of test data to be transmitted is 200 data per second, while the amount of data to be processed is 100 data per second. Therefore, it is determined that the processing performance of the requested resource amount calculation unit 142 is not ensured.

FIG. 12B shows the measurement results when 1.00 core is allocated to the container 1002 (P1). Because the amount of data in the test data and the amount of data to be processed are the same, the requested resource amount calculation unit 142 determines that the processing performance can be ensured.

FIG. 12C shows the measurement results when 1.10 cores are allocated to the container 1002 (P1). Because the amount of data in the test data and the amount of data to be processed are the same, the requested resource amount calculation unit 142 determines that processing performance can be ensured. The requested resource amount calculation unit 142 ends measurement because the amount of data to be processed does not change even when the amount of resources to be allocated is changed.

As a result of the above measurements, the 1.00 core, which maximizes processing performance and is the minimum resource amount, is the requested resource amount for the container 1002 (P1).

FIGS. 13A, 13B, and 13C show an example of the measurement of processing performance and the calculation of requested resource amount for the container 1002 (P2) of the tenant 111 (T1).

Since there is the container 1002 (P1) before the container 1002 (P2), the requested resource amount calculation unit 142 measures the amount of data processing while changing the amount of resources of the container 1002 (P2) after allocating the requested resource amount to the container 1002 (P1). The transmission amount of test data is 200 data per second. In this case, the container 1002 (P2) receives data of 200 data per second.

FIG. 13A shows the measurement results when 0.50 cores are allocated to the container 1002 (P2). Since the amount of data to be received is greater than the amount of data to be processed, the requested resource amount calculation unit 142 determines that the processing performance cannot be ensured.

FIG. 13B shows the measurement results when 2.00 cores are allocated to the container 1002 (P2). Because the amount of data in the test data and the amount of data to be processed are the same, the requested resource amount calculation unit 142 determines that processing performance can be ensured.

FIG. 13C shows the measurement results when 2.50 cores are allocated to the container 1002 (P2). Because the amount of data in the test data and the amount of data to be processed are the same, the requested resource amount calculation unit 142 determines that processing performance can be ensured. The requested resource amount calculation unit 142 ends measurement because the amount of data to be processed does not change even when the amount of resources to be allocated is changed.

As a result of the above measurements, the 2.00 cores, which maximize processing performance and are the minimum resource amount, are the requested resource amount of the container 1002 (P2).

In the second embodiment, when the training process is executed, the screen 400 as shown in FIG. 14 is displayed.

Next, a specific example of allocated resource amount adjustment process will be described.

Here, the indice i representing the tenant 111 (T1), the tenant 111 (T2), and the tenant 111 (T3) are assumed to be "1," "2," and "3". The indice k representing the VM 1001 (E1) and the VM 1001 (E2) are assumed to be "1" and "2". The indice k representing the container 1002 (P1), the container 1002 (P2), the container 1002 (P3), container 1002 (P4), container 1002 (P5), and the container 1002 (P6) are assumed to be "1", "2", "3", "4", "5", and "6".

In step S201, the requested resource amount of each tenant 111 is calculated. Specifically, the requested resource amount $D\_1$ of the tenant 111 (T1) is 3.00 cores, the requested resource amount D_2 of the tenant 111 (T2) is 3.50 cores, and the requested resource amount D_3 of the tenant 111 (T3) is 2.50 cores.

In step S202, the allocated resource amount ST_i of each normal tenant 111 is calculated. Here, the total resource amount S is 8 cores because it is the total number of cores of the processor that the VM 1001 (E1) and the VM 1001 (E2) can provide. The total amount D of the requested resource amount D_i is 9 cores. The coefficient C is 2.95 using Equation (4).

Therefore, the allocated resource amount ST_1 of the tenant 111 (T1) becomes 2.66 cores, the allocated resource amount ST_2 of the tenant 111 (T2) becomes 3.26 cores, the allocated resource amount ST_3 of the tenant 111 (T3) becomes 2.08 cores.

In step S203, the allocated resource amount SF_ij of the container 1002 is calculated. Specifically, the allocated resource amount SF_11 of the container 1002 (P1) becomes 0.89 cores, the allocated resource amount SF_12 of the container 1002 (P2) becomes 1.77 cores, the allocated resource amount SF_23 of the container 1002 (P3) becomes 0.93 cores, the allocated resource amount SF_24 of the container 1002 (P4) becomes 2.33 cores, the allocated resource amount SF_35 of the container 1002 (P5) becomes 0.83 cores, the allocated resource amount SF_36 of the container 1002 (P6) becomes 1.25 cores.

In step S204, it is determined whether or not adjustment of the allocated resource amount SF_ij is necessary. For the VM 1001 (E2), the resource amount that can be provided is 4 cores, but the sum of the allocated resource amounts SF_ij of the container 1002 (P2), the container 1002 (P4), and the container 1002 (P6) is 5.35 cores. Therefore, it is determined that the adjustment of the allocated resource amount SF_ij is necessary.

In step S206, after the arrangement of the container 1002 is changed, the processing of steps S207 to S211 is executed. Here, it is assumed that the arrangement destination of the container 1002 (P3) has been changed to the VM 1001 (E2), and the arrangement destination of the container 1002 (P4) has been changed to the VM 1001 (E1).

In step S207, the following is a specific example of steps S208 to S210 when VM 1001 (E1) is selected.

In step S208, the requested resource amount of each normal tenant 111 in the VM 1001 (E1) is calculated. The container 1002 (P1), the container 1002 (P4), and the container 1002 (P5) are arranged in the VM 1001 (E1). From Equation (6), the requested resource amount D_1,1 of the tenant 111 (T1) becomes the requested resource amount D_11 of the container 1002 (P1), the requested resource amount D_2,1 of the tenant 111 (T2) becomes the requested resource amount D_24 of the container 1002 (P4), the requested resource amount D_3,1 of the tenant 111 (T3) is the requested resource amount D_35 of the container 1002 (P5).

In step S209, the allocated resource amount of each normal tenant 111 in the VM 1001 (E1) is calculated. S_1 is 4 cores. The total number D_1 of the requested resource amount D_i,1 of all normal tenants 111 in the VM 1001 (E1) is 4.5 cores. The coefficient C_1 becomes 1.33 from Equation (9). When using Equation (7), the allocated resource amount ST_1,1 of the tenant 111 (T1) becomes 0.88 cores, the allocated resource amount ST_2,1 of the tenant 111 (T2) becomes 2.31 cores, the allocated resource amount ST_3,1 of the tenant 111 (T3) becomes 0.81 cores.

In step S210, the allocated resource amount of each container 1002 in the VM 1001 (E1) is calculated. Using Equation (10), the allocated resource amount SF_11,1 of the container 1002 (P1) becomes 0.88 cores, the allocated resource amount SF_24,1 of the container 1002 (P4) becomes 2.31 cores, and the allocated resource amounts SF_35,1 of the container 1002 (P5) become 0.81 cores.

In step S207, a specific example of steps S208 to S210 when the VM 1001 (E2) is selected will be described.

In step S208, the requested resource amount of each normal tenant 111 in the VM 1001 (E2) is calculated. The container 1002 (P2), the container 1002 (P3), and the container 1002 (P6) are arranged in the VM 1001 (E2). From Equation (6), the requested resource amount D_1,2 of the tenant 111 (T1) becomes the requested resource amount D_12 of the container 1002 (P2), the requested resource amount D_2,2 of the tenant 111 (T2) becomes the requested resource amount D_23 of the container 1002 (P3), the requested resource amount D_3,2 of the tenant 111 (T3) is the requested resource amount D_36 of the container 1002 (P6).

In step S209, the allocated resource amount of each normal tenant 111 in the VM 1001 (E2) is calculated. S_2 is 4 cores. The total number D_2 of the requested resource amount D_i,2 of all normal tenants 111 in the VM 1001 (E2) is 4.5 cores. The coefficient C_2 becomes 1.61 from Equation (9). When using Equation (7), the allocated resource amount ST_1,2 of the tenant 111 (T1) becomes 1.79 cores, the allocated resource amount ST_2,2 of the tenant 111 (T2) becomes 0.94 cores, the allocated resource amount ST_3,2 of the tenant 111 (T3) becomes 1.27 cores.

In step S210, the allocated resource amount of each container 1002 in the VM 1001 (E2) is calculated. Using Equation (10), the allocated resource amount SF_12,2 of the container 1002 (P2) becomes 1.79 cores, the allocated resource amount SF_23,2 of the container 1002 (P3) becomes 0.94 cores, and the allocated resource amount SF_36,2 of the container 1002 (P6) becomes 1.27 cores.

In the second embodiment, when the allocated resource amount adjustment process is executed, the screen 500 as shown in FIG. 15 is displayed.

Resources can be allocated to each container 1002 in each tenant 111 so that the amount of resources that the VM 1001 can provide is not exceeded.

Third Embodiment

In the third embodiment, a specific operation of the control system 100 will be described. In particular, the specific operation in the case of including the special tenant 111 will be described.

The configuration of the base element 110 and the data processing function 112 of the work base 101 is assumed to be the same as that of the second embodiment.

FIG. 16 is a diagram showing a specific example of the screen 300 of the third embodiment.

In the third embodiment, the resource allocated to the container 1002 is a processor core. The number of cores of the processor which the VM 1001 (E1) and the VM 1001 (E2) can provide is 4 cores. Further, each of the tenant 111 (T1) and the tenant 111 (T3) is set as a normal tenant 111, and the priority thereof is "3" and "2". In this case, the tenant 111 (T1) has the highest priority and the tenant 111 (T3) has the lowest priority. The tenant 111 (T2) is set as a special tenant 111.

Since the training process is the same as that described in the second embodiment, the description will be omitted. A specific example of the allocated resource amount adjustment process will be described.

Here, the indices i representing the tenant 111 (T1), the tenant 111 (T2), and the tenant 111 (T3) are assumed to be "1," "2," and "3." The indice k representing the VM 1001 (E1) and the VM 1001 (E2) are assumed to be "1" and "2". The indice k representing the container 1002 (P1), the container 1002 (P2), the container 1002 (P3), the container 1002 (P4), the container 1002 (P5), and the container 1002 (P6) are assumed to be "1", "2", "3", "4", "5", and "6".

In the third embodiment, when the training process is executed, the screen 400 as shown in FIG. 17 is assumed to be displayed.

In step S201, the requested resource amount of each tenant 111 is calculated. Specifically, the requested resource amount $D\_1$ of the tenant 111 (T1) is 3.00 cores, the requested resource amount $D\_2$ of the tenant 111 (T2) is 3.50 cores, and the requested resource amount $D\_3$ of the tenant 111 (T3) is 2.50 cores.

In step S202, the allocated resource amount $ST\_i$ of each normal tenant 111 is calculated. Here, the total resource amount S is 4.5 cores, which was obtained by subtracting the requested resource amount of the special tenant 111 from the total number of cores of processors that can be provided by the VM 1001 (E1) and the VM 1001 (E2). The total amount D of the requested resource amount $D\_i$ is 5.5 cores. The coefficient C is 2.25 using Equation (4).

Therefore, the allocated resource amount $ST\_1$ of the tenant 111 (T1) becomes 2.56 cores, the allocated resource amount $ST\_2$ of the tenant 111 (T2) becomes 3.5 cores, the allocated resource amount $ST\_3$ of the tenant 111 (T3) becomes 1.94 cores.

In step S203, the allocated resource amount $SF\_{ij}$ of the container 1002 is calculated. Specifically, the allocated resource amount $SF\_{11}$ of the container 1002 (P1) becomes 0.85 cores, the allocated resource amount $SF\_{12}$ of the container 1002 (P2) becomes 1.71 cores, the allocated resource amount $SF\_{25}$ of the container 1002 (P5) becomes 0.77 cores, and the allocated resource amount $SF\_{26}$ of the container 1002 (P6) becomes 1.25 cores. The allocated resource amount of the container 1002 (P3) of the special tenant 111 becomes 1.00 core, and the allocated resource amount of the container 1002 (P4) becomes 2.50 cores.

In step S204, it is determined whether or not adjustment of the allocated resource amount $SF\_{ij}$ is necessary. The amount of resources that the VM 1001 (E2) can provide is 4 cores, and the sum of the allocated resource amounts for the container 1002 (P2), the container 1002 (P4), and the container 1002 (P6) is 5.38 cores. Therefore, it is determined that the adjustment of the allocated resource amount $SF\_{ij}$ is necessary.

In step S206, after the arrangement of the container 1002 is changed, the processing of steps S207 to S211 is executed. Here, it is assumed that the arrangement destination of the container 1002 (P3) has been changed to the VM 1001 (E2), and the arrangement destination of the container 1002 (P4) has been changed to the VM 1001 (E1).

In step S207, a specific example of steps S208 to S210 when the VM 1001 (E1) is selected will be described.

In step S208, the requested resource amount of each normal tenant 111 in the VM 1001 (E1) is calculated. The container 1002 (P1) and the container 1002 (P5) are arranged in the VM 1001 (E1). From Equation (6), the requested resource amount $D\_{1,1}$ of the tenant 111 (T1) becomes the requested resource amount $D\_{11}$ of the container 1002 (P1), and the requested resource amount $D\_{3,1}$ of the tenant 111 (T3) is the requested resource amount $D\_{35}$ of the container 1002 (P5).

In step S209, the allocated resource amount of each normal tenant 111 in the VM 1001 (E1) is calculated. $S\_1$ is 1.5 cores. The total number $D\_1$ of the requested resource amount $D\_{i,1}$ of all normal tenants 111 in the VM 1001 (E1) is 2 cores. The coefficient $C\_1$ becomes 0.83 from Equation (9). Using Equation (7), the allocated resource amount of the tenant 111 (T1) becomes 0.80 cores, and the allocated resource amount of the tenant 111 (T3) is 0.70 cores.

In step S210, the allocated resource amount of each container 1002 in the VM 1001 (E1) is calculated. Using Equation (10), the allocated resource amount $SF\_{11,1}$ of the container 1002 (P1) is 0.80 cores, and the allocated resource amount $SF\_{35,1}$ of the container 1002 (P5) is 0.70 cores. The allocated resource amount of the container 1002 (P4) is 2.50 cores.

In step S207, a specific example of steps S208 to S210 when the VM 1001 (E2) is selected will be described.

In step S208, the requested resource amount of each normal tenant 111 in the VM 1001 (E2) is calculated. The container 1002 (P2) and the container 1002 (P6) are arranged in the VM 1001 (E1). From Equation (6), the requested resource amount $D\_{1,2}$ of the tenant 111 (T1) becomes the requested resource amount $D\_{12}$ of the container 1002 (P2), and the requested resource amount $D\_{3,2}$ of the tenant 111 (T3) becomes the requested resource amount $D\_{36}$ of the container 1002 (P6).

In step S209, the allocated resource amount of each normal tenant 111 in VM 1001 (E2) is calculated. $S\_2$ is three cores. The total number $D\_2$ of the requested resource amount $D\_{i,2}$ of all normal tenants 111 in the VM 1001 (E2) is 3.5 cores. The coefficient $C\_2$ becomes 1.42 from Equation (9). Using Equation (7), the allocated resource amount $ST\_{1,2}$ of the tenant 111 (T1) becomes 1.76 cores, and the allocated resource amount $ST\_{3,2}$ of the tenant 111 (T3) becomes 1.24 cores.

In step S210, the allocated resource amount of each container 1002 in the VM 1001 (E2) is calculated. Using Equation (10), the allocated resource amount $SF\_{12,2}$ of the container 1002 (P2) becomes 1.76 cores, and the allocated resource amount $SF\_{36,2}$ of the container 1002 (P6) becomes 1.24 cores. The allocated resource amount of the container 1002 (P3) is 1.00 core.

In the third embodiment, when the allocated resource amount adjustment process is executed, the screen 500 as shown in FIG. 18 is displayed.

Resources can be allocated to each container 1002 in each tenant 111 so that the amount of resources that the VM 1001 can provide is not exceeded.

REFERENCE SIGNS LIST

100: control system
101: work base
110: base element
110: target base element
111: tenant
112: data processing function
120: user input unit
121: resource amount input unit
122: special tenant input unit
123: tenant priority input unit
130: user output unit
131: setting content display unit
132: resource allocation status display unit
140: planning unit
141: test data transmission unit
142: requested resource amount calculation unit 143: allocated resource amount determination unit
150: reflecting unit
151: setting information generation unit
152: data processing function control unit
200: computer
201: processor
202: main storage device
203: auxiliary storage device
204: network interface
300, 400, 500, 600: screen
1001: VM
1002: container

The invention claimed is:

1. A computer system, comprising:
at least one computer including a processor, a storage device connected to the processor, and a network interface connected to the processor,
wherein the system is connected to a base having a plurality of tenants,
wherein the tenant operates at least one service, each service composed of a plurality of data processing functions,
wherein the base includes a plurality of base elements for executing the data processing functions,
wherein resources of the base elements are allocated to the data processing functions, and
wherein the at least one computer is programmed to:
calculate a first allocated resource amount to be allocated to each of the plurality of tenants based on a requested resource amount requested by the plurality of data processing functions of each of the plurality of tenants and a first provided resource amount that can be provided by the base,
calculate a second allocated resource amount, for each data processing function within the base, to be allocated to the plurality of data processing functions of each of the plurality of tenants based on the requested resource amount requested by the plurality of data processing functions of each of the plurality of tenants and the first allocated resource amount of each of the plurality of tenants,
allocate resources to the plurality of data processing functions of each of the plurality of tenants based on the second allocated resource amount,
determine whether a total amount of the second allocated resource amount is greater than the first provided resource amount, and upon determining the total amount of the second allocated resource amount is greater than the first provided resource amount, execute arrangement destination determination processing for determining the base element to be an arrangement destination of each of the plurality of data processing functions of each of the plurality of tenants so that, for each tenant, a Euclidean distance representing the difference between a total amount of requested resources of the data processing functions on the base element and a second provided resource amount able to be provided by the base element is minimized.

2. The computer system according to claim 1,
wherein the at least one computer is programmed to:
execute, for each of the plurality of base elements:
a process of calculating a third allocated resource amount to be allocated to each of the plurality of tenants in the base element, based on the requested resource amount of the data processing function of the plurality of tenants executed on the base element and the second provided resource amount able to be provided by the base element, and
a process of calculating a fourth allocated resource amount to be allocated to the plurality of data processing functions of each of the plurality of tenants in the base element, based on the requested resource amount requested by the plurality of data processing functions of each of the plurality of tenants executed on the base element and the third allocated resource amount of each of the plurality of tenants, and
a process of allocating resources to the plurality of data processing functions of each of the plurality of tenants based on the fourth allocated resource amount.

3. The computer system according to claim 2,
wherein a priority indicating the priority of the allocation of resources of the base is set to the plurality of tenants, and
wherein the at least one computer is programmed to:
calculate the first allocated resource amount of each of the plurality of tenants based on the requested resource amount requested by the plurality of data processing functions of each of the plurality of tenants, the first allocated resource amount of each of the plurality of tenants, and the priority of each of the plurality of tenants, and
calculate the third allocated resource amount of each of the plurality of tenants based on the requested resource amount of the data processing function of the plurality of tenants executed on the base element, the second provided resource amount of the base element, and the priority of each of the plurality of tenants.

4. The computer system according to claim 3,
wherein the at least one computer provides an interface for setting the priority of each of the plurality of tenants.

5. A resource allocation control method executed by a computer system, wherein the computer system includes at least one computer including a processor, a storage device connected to the processor, and a network interface connected to the processor, and is connected to a base with a plurality of tenants,
wherein the tenant operates at least one service, each tenant composed of a plurality of data processing functions,
wherein the base includes a plurality of base elements for executing the data processing function, and
wherein resources of the base elements are allocated to the data processing functions, the resource allocation control method, executed by the at least one computer, comprising:
calculating, a first allocated resource amount to be allocated to each of the plurality of tenants based on the requested resource amount requested by the plurality of data processing functions of each of the plurality of tenants and a first provided resource amount that the base can provide,
calculating, a second allocated resource amount, for each data processing function within the base, to be allocated to the plurality of data processing functions of each of the plurality of tenants based on the requested resource amount requested by the plurality of data processing functions of each of the plurality of tenants and the first allocated resource amount of each of the plurality of tenants, and allocating, resources to the plurality of data processing functions of each of the plurality of tenants based on the second allocated resource amount;

determining whether a total amount of the second allocated resource amount is greater than the first provided resource amount, and upon determining the total amount of the second allocated resource amount is greater than the first provided resource amount, execute arrangement destination determination processing for determining the base element to be an arrangement destination of each of the plurality of data processing functions of each of the plurality of tenants so that, for each tenant, a Euclidean distance representing the difference between a total amount of requested resources of the data processing functions on the base element and a second provided resource amount able to be provided by the base element is minimized.

6. The resource allocation control method according to claim 5, further comprising:

calculating a fourth allocated resource amount to be allocated to the plurality of data processing functions of each of the plurality of tenants for each of the plurality of base elements;

calculating a third allocated resource amount to be allocated to each of the plurality of tenants in the base element, based on the requested resource amount of the data processing function of the plurality of tenants executed on the base element and a second provided resource amount that can be provided by the base element;

calculating the fourth allocated resource amount of each of the plurality of tenants in the base element, based on the requested resource amount requested by the plurality of data processing functions of each of the plurality of tenants executed on the base element and the third allocated resource amount of each of the plurality of tenants; and allocating resources to the plurality of data processing functions of each of the plurality of tenants based on the fourth allocated resource amount.

7. The resource allocation control method according to claim 6, wherein a priority indicating the priority of the allocation of resources of the base is set to the plurality of tenants, and wherein the method further comprises:

calculating the first allocated resource amount of each of the plurality of tenants, based on the requested resource amount requested by the plurality of data processing functions of each of the plurality of tenants, the first allocated resource amount of each of the plurality of tenants, and the priority of each of the plurality of tenants; and calculating the third allocated resource amount of each of the plurality of tenants, based on the requested resource amount requested by the data processing functions of the plurality of tenants executed on the base element, the second provided resource amount of the base element, and the priority of each of the plurality of tenants.

8. The resource allocation control method according to claim 7, further comprising:

providing an interface for setting the priority of each of the plurality of tenants.

* * * * *